US008835779B2

(12) United States Patent
Tippanna Talikoti et al.

(10) Patent No.: US 8,835,779 B2
(45) Date of Patent: Sep. 16, 2014

(54) COORDINATED RATIOMETRIC COMPENSATION FOR HIGH-PRECISION LOAD-CELLS

(71) Applicants: Vijay Tippanna Talikoti, Karnataka (IN); Sudheer Beligere, Karnataka (IN); Ramesh Venkanna, Karnataka (IN)

(72) Inventors: Vijay Tippanna Talikoti, Karnataka (IN); Sudheer Beligere, Karnataka (IN); Ramesh Venkanna, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 177 days.

(21) Appl. No.: 13/622,889

(22) Filed: Sep. 19, 2012

(65) Prior Publication Data
US 2014/0076065 A1 Mar. 20, 2014

(51) Int. Cl.
*G01G 19/22* (2006.01)
*G01G 19/34* (2006.01)

(52) U.S. Cl.
USPC .................. 177/25.14; 177/25.11; 177/25.12; 177/25.13; 324/608

(58) Field of Classification Search
CPC .............................. G01L 1/2268; G01R 15/146
USPC .............................. 177/25.11–25.14; 324/608
See application file for complete search history.

(56) References Cited

U.S. PATENT DOCUMENTS 3,987,788 A * 10/1976 Emil ............................... 600/526
4,535,854 A * 8/1985 Gard et al. ......................... 177/1
4,974,679 A * 12/1990 Reuter ....................... 177/210 R
5,028,874 A * 7/1991 Parle .............................. 324/608
5,172,115 A 12/1992 Kerth et al.
5,426,416 A * 6/1995 Jefferies et al. ................ 340/664
5,579,247 A 11/1996 Kerth et al.
6,396,311 B2 5/2002 Inn
6,486,818 B1 11/2002 Nicholson et al.
6,580,277 B1 * 6/2003 Bolz .............................. 324/608
2010/0097733 A1 * 4/2010 E. ..................................... 361/42

FOREIGN PATENT DOCUMENTS

EP 500645 A1 9/1992
WO WO9107815 5/1991

OTHER PUBLICATIONS

National Instruments, Article, Measuring Bridge-Based Sensors with the Ratiometric Approach, 2 pgs, www.ni.com, Sep. 16, 2010.

(Continued)

*Primary Examiner* — Lisa Caputo
*Assistant Examiner* — Jonathan Dunlap
(74) *Attorney, Agent, or Firm* — Craige Thompson; Thompson Patent Law Offices

(57) ABSTRACT

Apparatus and associated methods relate to a load-cell measurement system having an output that is substantially independent of the system voltage source, by providing compensation for the source voltage variation using both a compensating offset voltage and a compensating reference voltage, these compensating voltages having a predetermined relationship with each other. In an illustrative example, the supply voltage may be directly connected to a load-cell, an instrumentation amplifier, and a compensation circuit. In some examples, the compensation circuit may include a chain of impedances which may generate two mutually related voltages both being scaled to the supply voltage. The first scaled voltage may, for example, substantially compensate offset of the load-cell measurement system. The second scaled voltage may, for example, substantially compensate for gain. In various examples, the compensating offset voltage and gain voltage may have a predetermined relationship so as to provide coordinated compensation of the system.

20 Claims, 10 Drawing Sheets

(56) References Cited

OTHER PUBLICATIONS

O'Grady, Albert, Transducer/Sensor Excitation and Measurement techniques, 6 pgs, dated 2000, Analog Dialogue 34-5.

Campbell Scientific, Inc., Voltage Measurement accuracy, Self-Calibration and Ratiometric Measurement, White Paper Code: 3, 6 pgs., copyrighted 2001.

Prashanth Holenarsipur, Maxim, Zero-Drift Instrumentation Amplifier (IA) takes the Strain Out of Sensor, dated Apr. 6, 2009, 6 pgs, Application Note 4437.

Bowling, Steve, Microchip Technology, Inc., Ratiometric Sensing Using the PIC16C774 (AN694), 27 pgs., copyright 2000.

* cited by examiner

300

|  | Ratiometric design | Value | Value | Units |
|---|---|---|---|---|
| 1 | Vsupply | 10 | 20 | V |
| 2 | R1 | 10000 | 10000 | Ω |
| 3 | R2 | 3700 | 3700 | Ω |
| 4 | Vo @ R2 | 2.70 | 5.40 | V |
|  |  |  |  |  |
|  |  |  |  |  |
| 5 | Gain | 100 | 100 |  |
|  |  |  |  |  |
| 6 | Max for 1mV/V | 0.01 | 0.02 |  |
| 7 | total output | 1 | 2 | V |
| 8 | Offset    constant | 1.5 | 1.5 | V |
| 9 | Total +Ve | 2.5 | 3.5 | V |
| 10 | Total −Ve | 0.5 | −0.5 | V |
| 11 | Total span | 2 | 4 | V |
|  |  |  |  |  |
|  |  |  |  |  |
| 12 | Bits | 16 | 16 |  |
| 13 | highest count | 65535 | 65535 |  |
| 14 | Middle count | 36398 | 18199 |  |
| 15 | lowest count | 0 | 0 |  |
| 16 | 1 LSB | 4.12E−05 | 8.242E−05 | V |
| 17 | total counts for FS +ve | 60664 | 42464 |  |
| 18 | total count remaining on +ve side | 4871 | 23071 |  |
| 20 | total counts for FS −ve | 12132 | −6067 |  |
| 21 | total count remaining on −ve side | 12132 | −6067 |  |

Missing counts on −ve side of ADC

| For 10V | | | |
|---|---|---|---|
| In-Amp out | ADC counts | ADC utilisation | Counts available |
|  | Max: 65535 |  | Buffer on |
| 2.5 |  | 60664 | +ve side: 4871 |
|  |  | ↕ | Total +ve: 24266 |
| Offset  1.5 | Mid: 36398 | 36398 |  |
|  |  | ↕ | Total −ve: 24266 |
| 0.5 |  | 12132 | Buffer on |
|  | Min:  0 |  | −ve side: 12132 |

Un-even count distribution

| For 20V | | | |
|---|---|---|---|
| In-Amp out | ADC counts | ADC utilisation | Counts available |
|  | Max: 65535 |  | Buffer on |
| 3.5 |  | 42464 | +ve side: 23071 |
|  |  | ↕ | Total +ve: 24265 |
| Offset  1.5 | Mid: 18199 | 18199 |  |
|  |  | ↕ | Total −ve: 24266 |
| −0.5 |  | −6067 | Buffer on |
|  | Min:  0 |  | −ve side: −6067 |

330

Missing counts on −ve side of ADC

FIG.3b
Prior Art

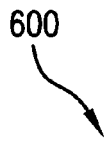

600

|   | Ratiometric design | Value | Value | Units |
|---|---|---|---|---|
| 1 | Vsupply | 10 | 20 | V |
| 2 | R1 | 10000 | 10000 | Ω |
| 3 | R2 | 3700 | 3700 | Ω |
| 4 | Vo @ R2 | 2.70 | 5.40 | V |
| 5 | Gain | 100 | 100 | |
| 6 | Max for 1mV/V | 0.01 | 0.02 | |
| 7 | total output | 1 | 2 | V |
| 8 | Offset    proportional | 1.35 | 2.70 | V |
| 9 | Total +Ve | 2.35 | 4.70 | V |
| 10 | Total −Ve | 0.350 | 0.70073 | V |
| 11 | Total span | 2 | 4 | V |
| 12 | Bits | 16 | 16 | |
| 13 | highest count | 65535 | 65535 | |
| 14 | Middle count | 32768 | 32768 | |
| 15 | lowest count | 0 | 0 | |
| 16 | 1 LSB | 4.12E−05 | 8.242E−05 | V |
| 17 | total counts for FS +ve | 57033 | 57033 | |
| 18 | total count remaining on +ve side | 8502 | 8502 | |
| 20 | total counts for FS −ve | 8501 | 8501 | |
| 21 | total count remaining on −ve side | 8501 | 8501 | |

Equal counts irrespective of supply voltage

| For 10V | | | |
|---|---|---|---|
| In-Amp out | ADC counts | ADC utilisation | Counts available |
| | Max: 65535 | | Buffer on +ve side: 8502 |
| 2.35 | | 57033 | |
| | | ↕ | Total +ve: 24265 |
| Offset 1.35 | Mid: 32768 | 32768 | |
| | | ↕ | Total -ve: 24267 |
| 0.35 | | 8501 | Buffer on -ve side: 8501 |
| | Min: 0 | | |

Equal counts on +ve and -ve margin

| For 20V | | | |
|---|---|---|---|
| In-Amp out | ADC counts | ADC utilisation | Counts available |
| | Max: 65535 | | Buffer on +ve side: 8502 |
| 4.70 | | 57033 | |
| | | ↕ | Total +ve: 24265 |
| Offset 2.7 | Mid: 32768 | 32768 | |
| | | ↕ | Total -ve: 24267 |
| 0.70 | | 8501 | Buffer on -ve side: 8501 |
| | Min: 0 | | |

630

No Missing counts equal for +ve and -ve span

FIG.6b

COORDINATED RATIOMETRIC COMPENSATION FOR HIGH-PRECISION LOAD-CELLS

TECHNICAL FIELD

Various embodiments relate generally to electrical compensation signals in load-cell measurement systems.

BACKGROUND

Power sources are used to supply power for electric and electronic devices and apparatuses. And as electrical apparatuses are ubiquitous in today's world, myriad electrical power sources are used. Although these power sources are varied, many of them deliver power that may not be precisely constant in terms of either voltage or current. Even electrical power delivered over power lines may surge or attenuate depending on both source and load conditions. These power irregularities may damage or interfere with the proper operation of the electrical apparatuses that depend on power sources. These irregularities may result in not only poor performance and irregular device behavior.

One type of an electrical apparatus is a load-cell which may be a device that converts a force into an electrical signal. These load-cells may be used to weigh objects, for example. But the systems in which these load-cells reside may have an output that varies as a result of various factors, such as temperature, circuit specific influences, and power source variation, for example.

Electrical apparatuses and electronic devices may have an output signal that represents a physical measurement. The difference between the signal representation and the actual measurement may be called measurement error. Many different phenomena may cause measurement error. Noise mechanisms, for example, may cause measurement error. Thermal noise may cause the resistors of a load-sensor, for example, to cause measurement error. Cross-talk from nearby wires and traces may couple into the measurement path and cause measurement error. Power supply rejection may be the term used to denote a circuit's ability to reject noise from the circuit's power supply. Power supply variation may be one source of power supply noise. The power supply noise that is not rejected by an apparatus or device may contribute to measurement error.

SUMMARY

Apparatus and associated methods relate to a load-cell measurement system having an output that is substantially independent of the system voltage source, by providing compensation for the source voltage variation using both a compensating offset voltage and a compensating reference voltage, these compensating voltages having a predetermined relationship with each other. In an illustrative example, the supply voltage may be directly connected to a load-cell, an instrumentation amplifier, and a compensation circuit. In some examples, the compensation circuit may include a chain of impedances which may generate two mutually related voltages both being scaled to the supply voltage. The first scaled voltage may, for example, substantially compensate offset of the load-cell measurement system. The second scaled voltage may, for example, substantially compensate for gain. In various examples, the compensating offset voltage and gain voltage may have a predetermined relationship so as to provide coordinated compensation of the system.

Various embodiments may achieve one or more advantages. For example, some embodiments may allow for the fewest device components or the lowest cost as may result using a resistor divider network for the compensation circuit. In some embodiments, the system output may be substantially invariant to the supply voltage variation. For example, the buffered compensation circuit may deliver the compensation voltages to their respective destinations with great fidelity. These buffers may provide precise compensation voltages even if the input impedance of the pins that they drive are fairly low. In various embodiments, the compensation network may make the measurement substantially invariant to power supply noise. In some embodiments, the full dynamic range of the analog-to-digital converter may be substantially utilized. This substantial utilization of the dynamic range may then make for good measurement resolution.

The details of various embodiments are set forth in the accompanying drawings and the description below. Other features and advantages will be apparent from the description and drawings, and from the claims.

BRIEF DESCRIPTION OF THE DRAWINGS

FIGS. 3a-3d depict a chart showing the present inventors' understanding of hypothetical performance of the prior-art circuit described with reference to FIG. 2.

FIGS. 6a-6d depict a chart illustrating exemplary performance of an exemplary CR Compensation.

Like reference symbols in the various drawings indicate like elements.

DETAILED DESCRIPTION OF ILLUSTRATIVE EMBODIMENTS

Figure 1:
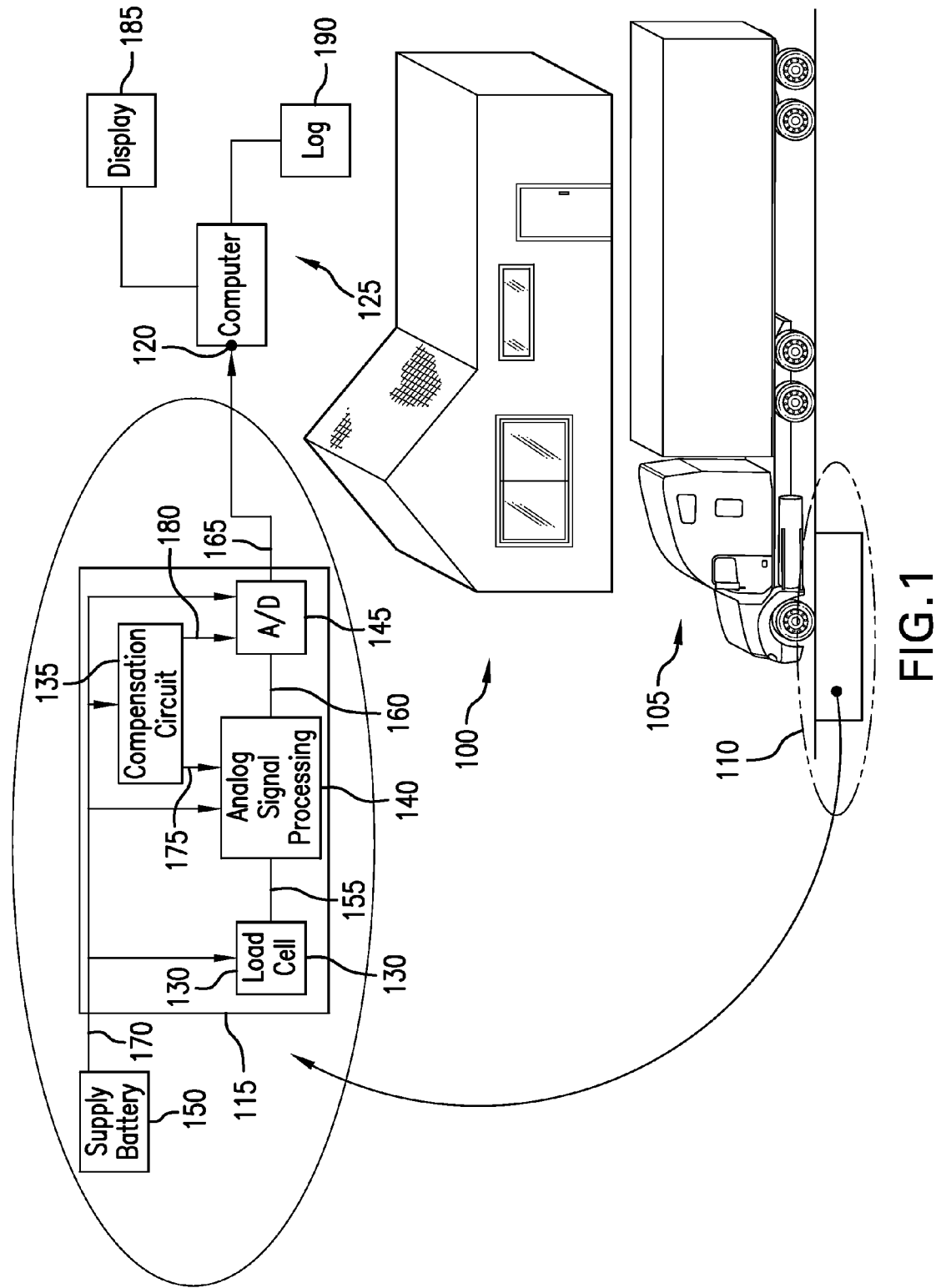
FIG. 1 depicts a field implementation of an exemplary Coordinated Ratiometric Compensation for High Precision Load Cells (CR Compensation).
Figure 2:
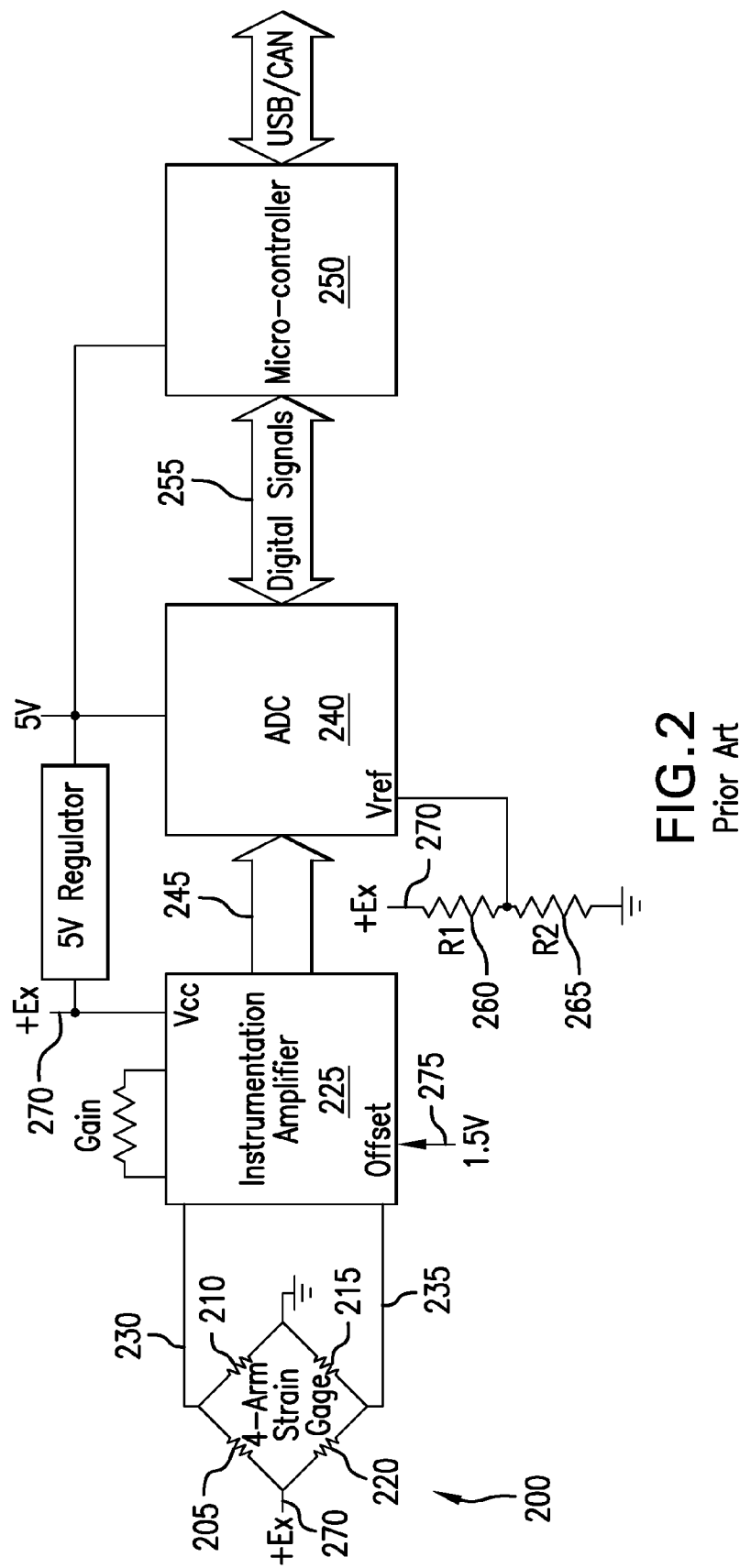
FIG. 2 depicts a schematic of a prior-art circuit.
Figure 4:
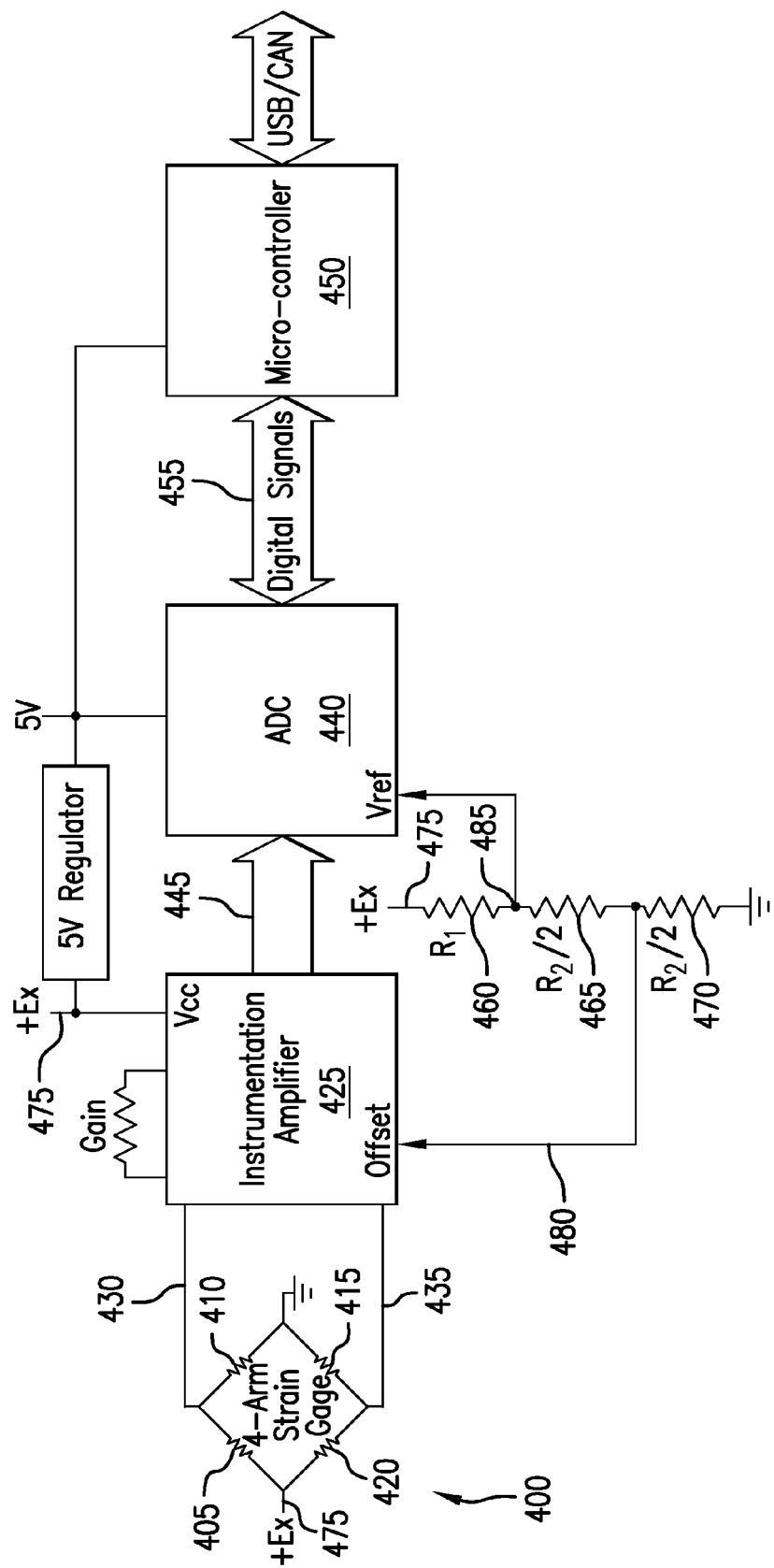
FIG. 4 depicts a schematic of an exemplary CR Compensation embodiment.
Figure 5:
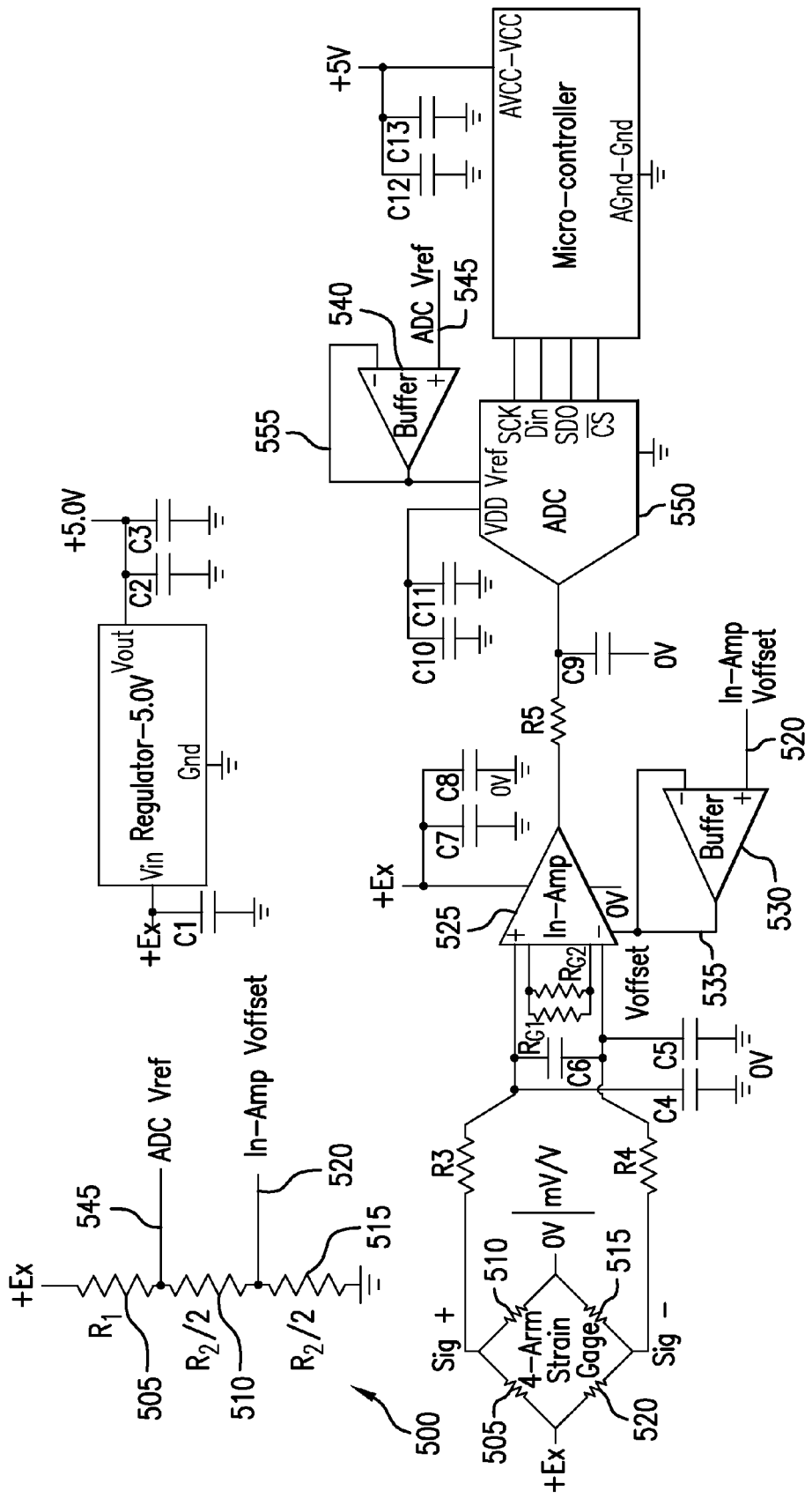
FIG. 5 depicts a schematic of an exemplary CR Compensation embodiment.

To aid understanding, this document is organized as follows. First, FIG. 1 is introduced to depict a field implementation of an exemplary Coordinated Ratiometric Compensation for High Precision Load-Cells (CR Compensation). Second, with reference to FIGS. 2 and 3a-3d, the discussion turns to a prior-art embodiment that illustrates the measurement variation induced by the variable supply. Specifically, FIG. 2 depicts a schematic of a prior-art circuit, and FIGS. 3a-3d depict some of the prior-art circuit's measured parameters. Third, with reference to FIGS. 4, 5 and 6a-6d, the discussion turns to exemplary CR Compensation embodiments that illustrate the improved ratiometric performance realized using these exemplary embodiments. Specifically, FIGS. 4 and 5 depict two schematics of two different exemplary CR Compensation embodiments, and FIGS. 6a-6d depict some of the measured parameters of these exemplary CR Compensation embodiments.

FIG. 1 depicts a field implementation of an exemplary variable voltage reference and offset for high-precision load-cells (CR Compensation). This figure depicts a trucking weigh station 100 which is weighing a truck 105. The truck 105 is parked on a weighing platform 110. An exemplary CR Compensation 115 translates the weight of the truck into a digital signal represented on a node 165 which is then communicated to a computer logging system 125. The exemplary CR Compensation 115 comprises a load-cell 130, a compensation circuit 135, an analog signal-processing block 140, and an analog-to-digital converter 145. This figure depicts a battery 150 which is sourcing the supply voltage for the CR Compensation 115. The digital signal represented on the node 165 may substantially representative of the truck's weight. The digital signal represented on the node 165 also may be substantially independent of the supply voltage generated by the battery 150.

FIG. 1 depicts the load-cell 130 of the CR Compensation 115 being located in the weighing platform 110. In this way, the force of the truck's weight is mechanically communicated to the load-cell 130. The load-cell 130 then converts this force to an electrical signal which is then communicated to the analog signal-processing block 140 via a load-cell output node 155. The signal is processed by the analog signal-processing block 140 and then transmitted to the analog-to-digital converter 145 via an analog signal-processing block's output node 160. The analog-to-digital converter 145 then converts this analog signal to a digital representation and communicates this representation to the computer logging system 125 via a node 165. In this example, the battery 150 is directly connected, via a node 170, to the load-cell 130, the analog signal-processing block 140, and the analog-to-digital converter 145, as well as the compensation circuit 135. The compensation circuit 135 operates from the supply voltage to generate two signals: an offset signal, which is communicated via a node 175 to the analog signal-processing block 140, and a reference signal, which is communicated via a node 180 to the analog-to-digital converter 145. The reference and offset signals are generated for the purpose of making the digital representation of the truck weight substantially ratiometric. In this example, the digital representation of the truck weight may be substantially independent of the battery voltage variation.

The computer logging system may have a display 185 and/or a logging device 190. The display 185 and/or logging device 190 may dispay and/or store the weight values of all the trucks 105 which are weighed by the weighing platform 110. These stored and/or displayed weight values represent the high precision load cell signal that has been processed automatically to yield a substantially coordinated gain and offset compensation that may advantageously improve accuracy of the system measurement over temperature, process variations, and supply voltage variations, for example.

FIG. 2 depicts a schematic of a prior-art circuit. In this example, the load-cell 200 comprises four resistors 205, 210, 215, and 220 configured as a Wheatstone bridge. The differential outputs of the load-cell 200 are communicated to an instrumentation amplifier 225 via a node 230 and a node 235. The instrumentation amplifier 225 then communicates its output to an analog-to-digital converter 240 via a node 245. The analog-to-digital converter 240 converts the voltage presented to it on node 245 as a digital code and communicates this code to a micro-controller 250 via a node 255. In this figure, the supply voltage is directly connected to the instrumentation amplifier 225, the load-cell 200, and a resistor divider comprising resistors 260 and 265, via a node 270. This resistor divider generates a reference signal for the analog-to-digital converter 240 which is proportional to the supply voltage. In this example, the offset pin of the instrumentation amplifier is connected to a fixed voltage of 1.5 volts via a node 275.

Figure 3D:
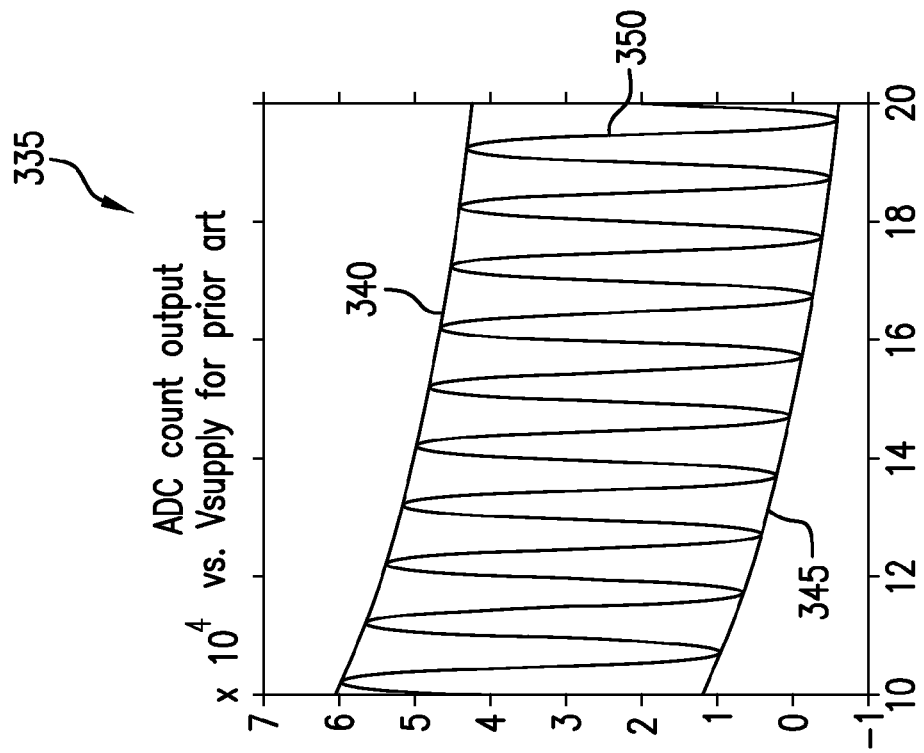

FIGS. 3a-3d depict a chart showing the present inventors' understanding of hypothetical performance of the prior-art circuit described with reference to FIG. 2. FIGS. 3a-3d depict the various node voltages and digital code representations that are expected using the prior-art representation depicted in FIG. 2. FIG. 3a depicts a table 300 of analog signals that may be measured on certain nodes in FIG. 2. The first column of the table 300 numbers the signals described in the table 300. The second column of the table 300 identifies the name of each signal parameter. The third column gives the value of each parameter when the supply voltage is 10 volts. The fourth column gives the value of each parameter when the supply voltage is 20 volts. In this example, the load-cell sensor generates a signal of +/−1 mV/V. Thus, for a 10 Volt supply, the load-cell's differential output voltage is +/−0.01 volts as is depicted in the third column of line 6 of table 300. And for a 20 Volt supply, the load-cell's differential output voltage is +/−0.02 volts, which is indicated in the fourth column of line 6 of the table 300. The instrumentation amplifier has a fixed gain of 100, making the dynamic range of the output of the instrumentation amplifier +/−1 Volt for the 10V supply case, as indicated in line 7 of table 300. This output dynamic range is centered at the voltage supplied to the offset pin of the differential amplifier, in this case 1.5V, as indicated in line 8 of table 300. The resulting output voltages of the instrumentation amplifier are thus the sum of the offset voltage and the dynamic range of output voltages. Thus the output voltage ranges from 0.5V to 2.5V for the 10V supply case, and from −0.5V to 3.5V for the 20V supply case, as indicated in lines 9 and 10 of table 300.

Figure 3C:
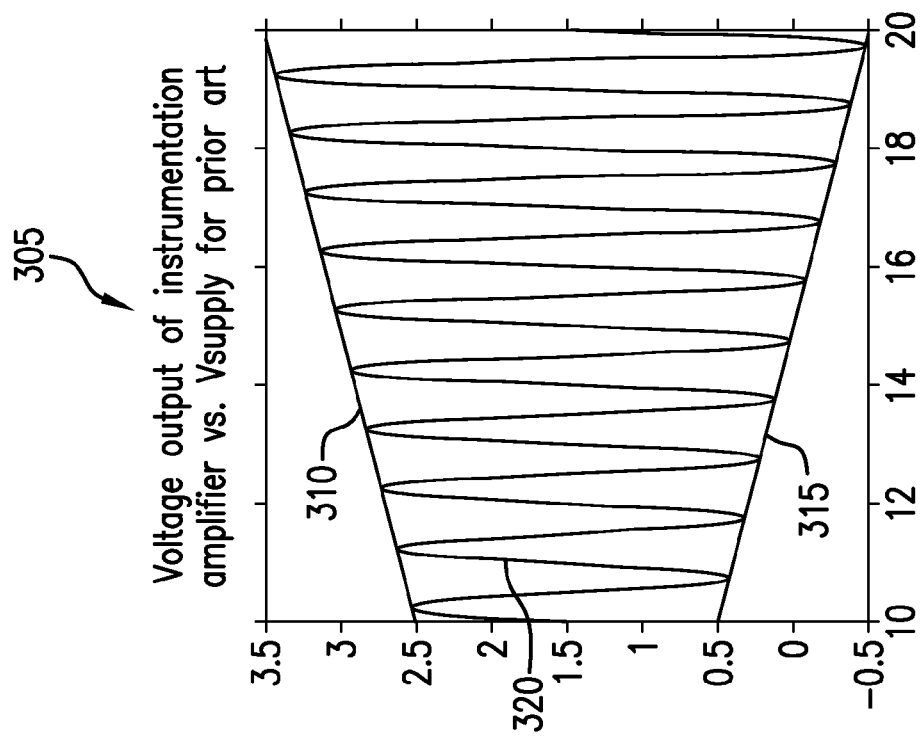

FIG. 3c depicts a graph 305 showing the instrumentation amplifier output voltages as a function of supply voltage for the prior-art circuit depicted in FIG. 2. Graph 305 shows a line 310 indicating the voltage of signal +Ve (defined here as the maximum signal value and corresponding to line 9 of table 300) varying from 2.5V to 3.5V linearly as Vsupply increases from 10V to 20V. Graph 305 shows a line 315 indicating the voltage of signal −Ve (defined here as the minimum signal value and corresponding to line 10 of table 300) varying from 0.5V to −0.5V linearly as Vsupply increases from 10V to 20V. Graph 305 also shows a hypothetical sinusoidal line 320 demonstrating the envelope of voltages contained between the +Ve (maximum signal value) and −Ve (minimum signal value) signals as Vsupply ranges from 10V to 20V.

FIG. 3b continues this analysis from the outputs of the instrumentation amplifier (signals +Ve and −Ve) through the analog-to-digital conversion process. Two charts 325 and 330 are depicted in FIG. 3b. The top chart 325 is for a supply voltage of 10V, and the bottom chart 330 is for a supply voltage of 20V. Chart 325 shows the digital code assignments for three cases, the maximum signal case (+Ve), the nominal signal case, and the minimum signal case (−Ve). The top line of chart 325 indicates that the code assigned to the maximum signal case is 60664 (out of a maximum possible code of 65535). The middle line of chart 325 indicates that the code assigned to the nominal case is 36398. The last line of chart 325 indicates that the code assigned to the minimum signal case is 12132. Chart 330 shows the digital code assignments for these same three cases, the maximum signal case, the nominal signal case, and the minimum signal case, but when the supply voltage is 20V. The top line of chart 330 indicates that the code assigned to the maximum signal case for a Vsupply of 20V is 42464. The middle line of chart 330 indicates that the code assigned to the nominal case is 18199. The last line of chart 330 indicates that the code assigned to the minimum signal case would be −6067, but is in fact impossible for an unsigned analog-to-digital converter as 0 is the minimum code of such an an unsigned ADC. Thus, the low signal cases (those approaching the minimum signal −Ve) would all saturate at 0 for the 20V supply case.

FIG. 3d depicts a graph 335 showing the analog-to-digital converter output codes as a function of supply voltage for the prior-art embodiment depicted in FIG. 2. Graph 335 shows a line 340 indicating the digital code associated with signal +Ve (corresponding to the top line of charts 325 and 330) varying from 60664 to 42464 non-linearly as Vsupply increases from 10V to 20V. Graph 335 shows a line 345 indicating the digital code associated with signal −Ve (corresponding to the bottom lines of charts 325 and 330) varying from 12132 to −6067 non-linearly as Vsupply increases from 10V to 20V. Graph 335 also shows a sinusoidal line 350 demonstrating the envelope of digital codes contained between those associated with the +Ve and those associated with the −Ve signals.

FIG. 4 depicts a schematic of an exemplary CR Compensation embodiment. In this example, the load-cell 400 includes four resistors 405, 410, 415, and 420 configured as a Wheatstone bridge. The differential outputs of the load-cell 400 are communicated to the instrumentation amplifier 425 via a node 430 and a node 435. The instrumentation amplifier 425 then communicates its output to an analog-to-digital converter 440 via a node 445. The analog-to-digital converter 440 converts the voltage presented to it on the node 445 as a digital code and communicates this code to a micro-controller 450 via a node 455. In this example figure, the supply voltage is directly connected to the instrumentation amplifier 425, the load-cell 400, and a resistor divider chain formed to include resistors 460, 465, and 470, and supplied via a node 475. This resistor divider chain generates a reference signal for the analog-to-digital converter 440, the reference signal being proportional to the supply voltage. This resistor diver chain also generates an offset voltage for the instrumentation amplifier 425, the offset signal being proportional to the supply voltage. In this example, the reference signal equals R2/(R1+R2) times the supply voltage. In this example the offset signal is connected to the offset pin of the instrumentation amplifier via a node 480, and the reference signal is coupled to the ADC 440 via a node 485. The offset signal in this embodiment is one half that of the reference signal.

FIG. 5 depicts a schematic of an exemplary CR Compensation embodiment. In the embodiment depicted in FIG. 5, a compensation circuit 500 includes a resistor chain of three resistors 505, 510, and 515. But in this embodiment, the offset signal of a node 520 does not directly connect to the instrumentation amplifier 525. A buffer 530 receives the signal of node 520 at the positive input of the buffer 530. The buffer 530 then has its output connected to the offset pin of the instrumentation amplifier 525 via a node 535. This arrangement may be used when the input impedance of the offset pin of the instrumentation amplifier is not of high impedance with respect to the resistor chain's resistances, for example. A reference signal buffer 540 is interposed between the reference signal of a node 545 and a reference pin of the analog-to-digital converter 550. Again, the node 545 is buffered by the reference signal buffer 540. The output of the reference signal buffer 545 is then connected to the reference pin (Vref) of the analog-to-digital converter via a node 555.

Figure 6C:
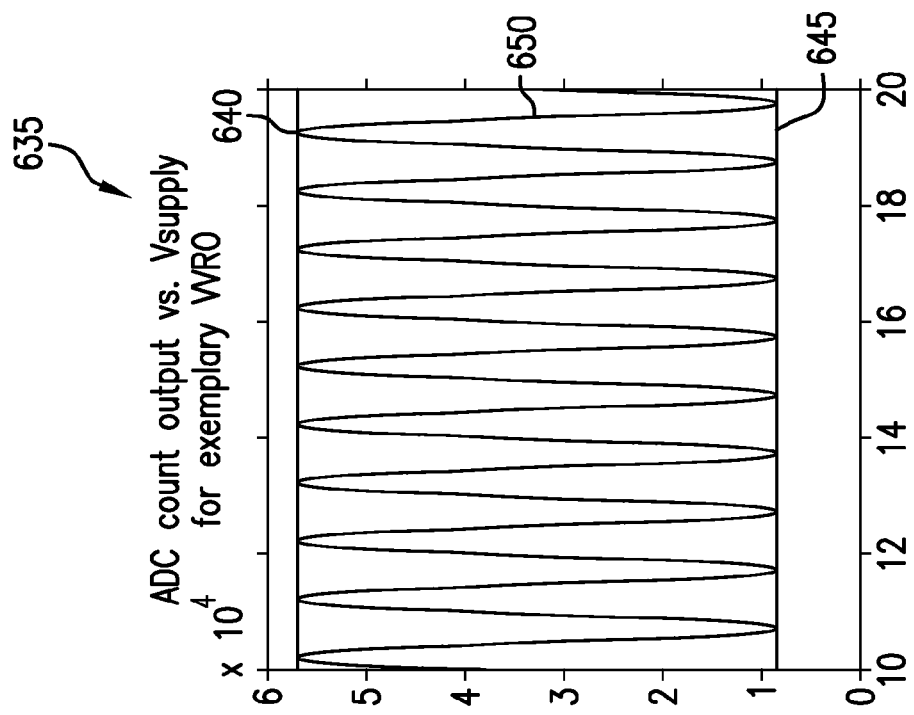

FIGS. 6a-6d depict a chart illustrating exemplary performance of an exemplary CR Compensation. FIGS. 6a-6d depict various node voltages and digital code representations that are realized using the CR Compensation embodiments depicted in FIGS. 4 and 5. FIG. 6a depicts a table 600 of many of the analog signals that may be measured on certain nodes in FIGS. 4 and 5. The first column of the table 600 numbers the signals described in the table 600. The second column of the table 600 identifies the name of the signal parameter. The third column gives the value of the parameter when the supply voltage is 10 volts. The fourth column gives the value of the parameter when the supply voltage is 20 volts. In this example, the load-cell sensor generates a signal of +/−1 mV/V. Thus, for a 10 Volt supply, the load-cell's differential output voltage is +/−0.01 volts as is depicted in the third column of line 6 of table 600. And for a 20 Volt supply, the load-cell's differential output voltage is +/−0.02 volts, which is indicated in the fourth column of line 6 of the table 600. The instrumentation amplifier has a fixed gain of 100, making the dynamic range of the output of the instrumentation amplifier +/−1 Volt for the 10V supply case, as indicated in line 7 of table 600. This signal is centered at the voltage supplied to the offset pin of the instrumentation amplifier, in this case, instead of a fixed 1.5V offset, the offset voltage is a function of the supply voltage. The offset signal is created from the compensation resistor divider chain of resistors 460, 465, and 470 in the embodiment depicted in FIG. 4, for example. The result of this compensation in this example is an offset voltage that varies from 1.35V to 2.7V as the supply voltage varies from 10V to 20V as indicated in line 8 of table 600. The resulting output voltages of the instrumentation amplifier are thus the sum of the offset voltage and the dynamic range of the instrumentation amplifier's output voltage. Thus the output voltages are 0.35V and 2.35V for the 10V supply case, and 0.7V and 4.7V for the 20V supply case, as indicated in lines 9 and 10 of table 600.

FIG. 6c depicts a graph 605 showing the instrumentation amplifier output voltages as a function of supply voltage for the embodiments described with reference to FIGS. 4 and 5. Graph 605 shows a line 610 indicating the voltage of signal +Ve (corresponding to line 9 of table 600) varying from 2.35V to 4.7V linearly as Vsupply increases from 10V to 20V. Graph 605 shows a line 615 indicating the voltage of signal −Ve (corresponding to line 10 of table 600) varying from 0.35V to 0.7V linearly as Vsupply increases from 10V to 20V. Graph 605 also shows a sinusoidal line 620 demonstrating the envelope of voltages contained between the +Ve and −Ve signals.

FIG. 6b continues this analysis from the outputs of the instrumentation amplifier (signals +Ve and −Ve) through the analog-to-digital conversion process. Two charts 625 and 630 are depicted in FIG. 6b. The top chart 625 is for a supply voltage of 10V, and the bottom chart 630 is for a supply voltage of 20V. Chart 625 shows the digital code assignments for three cases, the maximum signal case (corresponding to +Ve), the nominal signal case, and the minimum signal case (corresponding to −Ve). The top line of chart 625 indicates that the code assigned to the maximum signal case is 57033 (out of a maximum possible code of 65535). The middle line of chart 625 indicates that the code assigned to the nominal case is 32768. The last line of chart 625 indicates that the code assigned to the minimum signal case is 8501. Chart 630 shows the digital code assignments for these same three cases, the maximum signal case, the nominal signal case, and the minimum signal case, but when the supply voltage is 20V. The top line of chart 630 indicates that the code assigned to the maximum signal case for a Vsupply of 20V is again 57033. The middle line of chart 630 indicates that the code assigned to the nominal case is again 32768. The last line of chart 630 indicates that the code assigned to the minimum signal case is again 8501. This shows the supply voltage independent behavior of the CR Compensation embodiments.

Figure 6D:
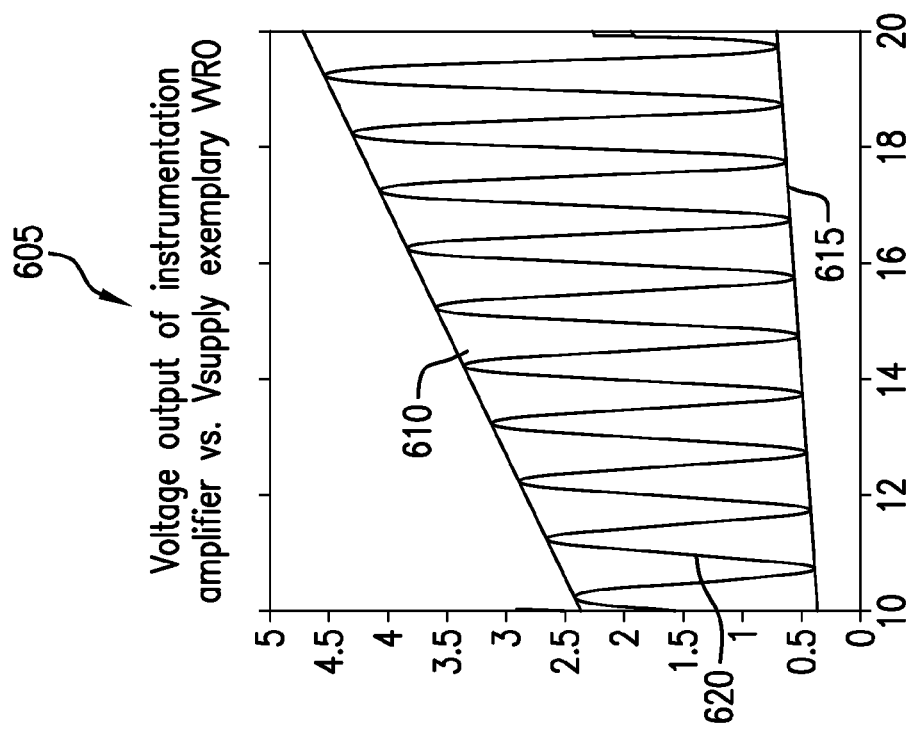

FIG. 6d depicts a graph 635 showing the analog-to-digital converter output codes as a function of supply voltage for the prior-art embodiment depicted in FIGS. 4 and 5. Graph 635 shows a line 640 indicating the digital code associated with signal +Ve (corresponding to the top line of charts 625 and 630) being constant at 57033 as Vsupply increases from 10V to 20V. Graph 635 shows a line 645 indicating the digital code associated with signal −Ve (corresponding to the bottom lines of charts 625 and 630) being constant at 8501 as Vsupply increases from 10V to 20V. Graph 635 also shows a sinusoidal line 650 demonstrating the envelope of digital codes contained between those associated with the +Ve and those associated with the −Ve signals. These embodiments demonstrate the output digital code assigned to a given load-cell output signal may be largely independent of the supply voltage, in these embodiments.

Although various embodiments have been described with reference to the Figures, other embodiments are possible. For example, the analog-to-digital converter need not be of the unsigned variety. Various embodiments may include a signed analog-to-digital converter (ADC). In some embodiments power may be supplied to the ADC using both positive and negative voltage sources. Such an arrangement may, for example, allow the analog-to-digital converter to be centered at substantially about zero volts. This may result in the reference voltage compensation to introduce no offset variation. Such an arrangement may allow the gain compensation and the offset compensation independence from one another. The supply voltage may range, in some examples, higher than 20 Volts, such as up to about 24, 28, 30, 32, 34, 36, 38, or at least about 40 Volts, for example.

In various embodiments, a compensation circuit may be performed using a resistor divider to generate one master compensation signal. This master compensation signal can then be buffered, for example, twice. By way of example and not limitation, the first buffer may be a unity gain buffer or a buffer with some other gain. Using the gain of the first buffer, the offset compensation signal may be generated and delivered to the instrumentation amplifier's offset pin. The second buffer again may be a unity gain buffer or a buffer with some other gain. Using the gain of the second buffer, the reference compensation signal may be generated and delivered to the analog-to-digital converter. The ratio of the gains of the two buffers may be the predetermined relationship necessary for system offset and gain compensation requirement. In another exemplary embodiment, an operational amplifier configured as a differential amplifier may be substituted for the instrumentation amplifier.

In some embodiments, the compensation circuit may be implemented using a capacitive network to perform a voltage division. In various embodiments, the capacitive network may be sampled at discrete time intervals. Some embodiments, for example, may initialize the capacitors with a predetermined charge before performing a measurement and then connect the network to the supply before sampling. A measurement may then be sampled at a discrete time after the capacitive network is connected to the supply. In some embodiments, the circuitry may then be operated at a reduced power between sample taking.

In some embodiments, the transducer may include a resistor divider or a capacitor divider. In such an example, the output of the transducer may be single ended. The transducer's output in this example may be summed with an offset adjust signal. This summed signal may then be connected to the input of an analog-to-digital converter. The analog-to-digital converter may have a reference signal with a predetermined relationship to the offset adjust signal. This predetermined relationship for the single-ended transducer case may be very different from that of the differential transducer case, for example.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A method of performing ratiometric measurement, the method comprising:
   receiving a supply voltage signal;
   supplying the received supply voltage signal directly to operate a transducer having a signal gain from an input to an output, the signal gain being substantially proportional to the supply voltage, and wherein the transducer is a load-cell;
   supplying the received supply voltage directly to a compensation circuit;
   generating from the compensation circuit an offset signal and a reference signal;
   coupling an output of the transducer to an input of an amplifier;
   coupling the output of the amplifier to an input of an analog-to-digital converter (ADC);
   coupling the reference signal to the ADC, the reference signal making a dynamic range of the ADC substantially proportional to a dynamic range of the transducer; and
   coupling the offset signal to the amplifier, the offset signal centering the dynamic range of the output of the amplifier within a dynamic range of the input of the ADC.

2. The method of claim 1, wherein the transducer further comprises a Wheatstone bridge.

3. The method of claim 1, wherein the transducer further comprises a resistor divider.

4. The method of claim 1, wherein the transducer is a force measuring transducer.

5. The method of claim 1, wherein the transducer generates a differential output signal, and the amplifier comprises a differential pair of input terminals.

6. The method of claim 1, wherein the amplifier is an instrumentation amplifier.

7. The method of claim 1, wherein the reference signal voltage is approximately equal to twice the offset signal voltage.

8. The method of claim 1, wherein the supply voltage variation is between 10 volts and at least 20 volts.

9. A measurement system comprising:
   a transducer that is biased with a supply voltage, the transducer having an output terminal, the output terminal having an offset and a gain, the offset and the gain being both proportional to the supply voltage;
   an amplifier having an input terminal, an output terminal, and an offset adjust terminal, the input terminal of the amplifier being connected to the output terminal of the transducer;
   an analog-to-digital converter (ADC) having an input terminal, an output terminal and a reference terminal, the input terminal being connected to the output terminal of the amplifier, and the input of the ADC having a dynamic range proportional to the reference;
   a first scaled measure of the supply voltage connected to the offset adjust terminal of the instrumentation amplifier; and
   a second scaled measure of the supply voltage having predetermined relationship to the first scaled measure, the second scaled measure being connected to the reference terminal of the ADC.

10. The method of claim 9, wherein the transducer is a load-cell.

11. The method of claim 9, wherein the transducer comprises a resistor divider.

12. The method of claim 9, wherein the transducer is a force measuring transducer.

13. The method of claim 9, wherein the transducer generates a differential output signal, and the amplifier comprises a differential pair of input terminals.

14. The method of claim 9, wherein the amplifier is an instrumentation amplifier.

15. The measurement system of claim 9, wherein the predetermined relationship of the second scaled measure is approximately two times that of the first scaled measure.

16. The method of claim 9, wherein the supply voltage variation is between 10 volts and 20 volts.

17. A measurement system comprising:
  a transducer that is biased with a supply voltage, the transducer having an output terminal, the output terminal having an offset and a gain, the offset and the gain being both proportional to the supply voltage;
  an amplifier having an input terminal, an output terminal, the input terminal of the amplifier being connected to the output terminal of the transducer;
  an analog-to-digital converter (ADC) having an input terminal, an output terminal, the input terminal being connected to the output terminal of the amplifier;
  means for compensating the gain variation caused by the variable supply voltage using a first scaled measure of the supply voltage; and
  means for compensating the offset variation caused by the variable supply voltage using a second scaled measure of the supply voltage having a predetermined relationship to the first scaled measure.

18. The method of claim 17, wherein the transducer is a load-cell.

19. The method of claim 17, wherein the transducer generates a differential output signal, and the amplifier comprises a differential pair of input terminals.

20. The measurement system of claim 17, wherein the predetermined relationship of the second scaled measure is approximately two times that of the first scaled measure.

* * * * *